United States Patent [19]

Lu

[11] Patent Number: 5,362,153
[45] Date of Patent: Nov. 8, 1994

[54] LITTER BAG FOR AUTOMOBILES

[76] Inventor: Shao W. Lu, Fl. 4, No. 22-1, Lane 256, Jui An St., Taipei, Taiwan, Prov. of China

[21] Appl. No.: 814,838

[22] Filed: Dec. 31, 1991

[51] Int. Cl.⁵ .......................................... B65D 30/22
[52] U.S. Cl. .................................. 383/38; 383/22; 383/41; 383/43; 383/66; 224/42.46 R; 220/404
[58] Field of Search ............... 224/42.46 B, 42.46 A, 224/42.46, 275, 42.46 R; 206/554, 390; 220/407, 404; 383/37, 38, 40, 41, 63, 66, 111, 33, 43, 22; 150/117

[56] References Cited

U.S. PATENT DOCUMENTS

| | | | |
|---|---|---|---|
| 2,767,895 | 10/1956 | Smith | 224/42.46 R |
| 3,162,305 | 12/1964 | Schoppa | 206/554 |
| 3,608,712 | 9/1971 | Savoie | 206/554 X |
| 3,800,503 | 4/1974 | Maki | 220/407 |
| 4,154,383 | 5/1979 | Honatzis | 224/42.46 R |
| 4,679,701 | 7/1987 | Ackermann et al. | 220/404 |
| 4,850,508 | 7/1989 | Lee | 220/407 |
| 4,993,845 | 2/1991 | Faltynek | 383/40 |
| 5,022,528 | 6/1991 | Savoy | 206/545 |

Primary Examiner—Allan N. Shoap
Assistant Examiner—Jes F. Pascua
Attorney, Agent, or Firm—Alfred Lei

[57] ABSTRACT

This invention relates to a litter bag for automobiles and in particular to one including a body portion provided at the lower portion with a pocket and on the outer surface with a zipper through which a roll of plastic bags may be disposed therein. The top of the pocket has an elongated slit through which the plastic bag may be conveniently drawn out for use. The bottom of the body portion has a strap designed to fix the body portion under a seat. The upper edges of the body portion has a resilient member in the interior for keeping the mouth of the plastic bag closed normally and a male connector on both ends. The body portion is further provided on both sides with a side flap having on both ends a female connector engageable with the male connector.

1 Claim, 3 Drawing Sheets

LITTER BAG FOR AUTOMOBILES

BACKGROUND OF THE INVENTION

It is found that the litter bags for use in an automobile on the market are either inconvenient to use or too large in size thereby making them unsuitable for use in the automobile.

Therefore, it is an object of the present invention to provide a litter bag which is especially designed for use automobiles and may obviate and mitigate the above-mentioned drawbacks.

SUMMARY OF THE INVENTION

This invention relates to a litter bag for automobiles.

It is the primary object of the present invention to provide a litter bag for automobiles containing a plurality of plastic bags which may be conveniently replaced as desired.

It is another object of the present invention to provide a litter bag for automobiles which may be mounted under a seat.

It is still another object of the present invention to provide a litter bag for automobiles which may be hanged on the back of a seat.

It is still another object of the present invention to provide a litter bag for automobiles which will keep the mouth of the plastic bag closed normally.

It is a further object of the present invention to provide a litter bag for automobiles which is easy to use.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is callable of other embodiments and of being practiced or carried out in various ways. Also it is to be understood that the phraseology or terminology employed herein is for the purpose of description and not of limitation.

Figure 1:
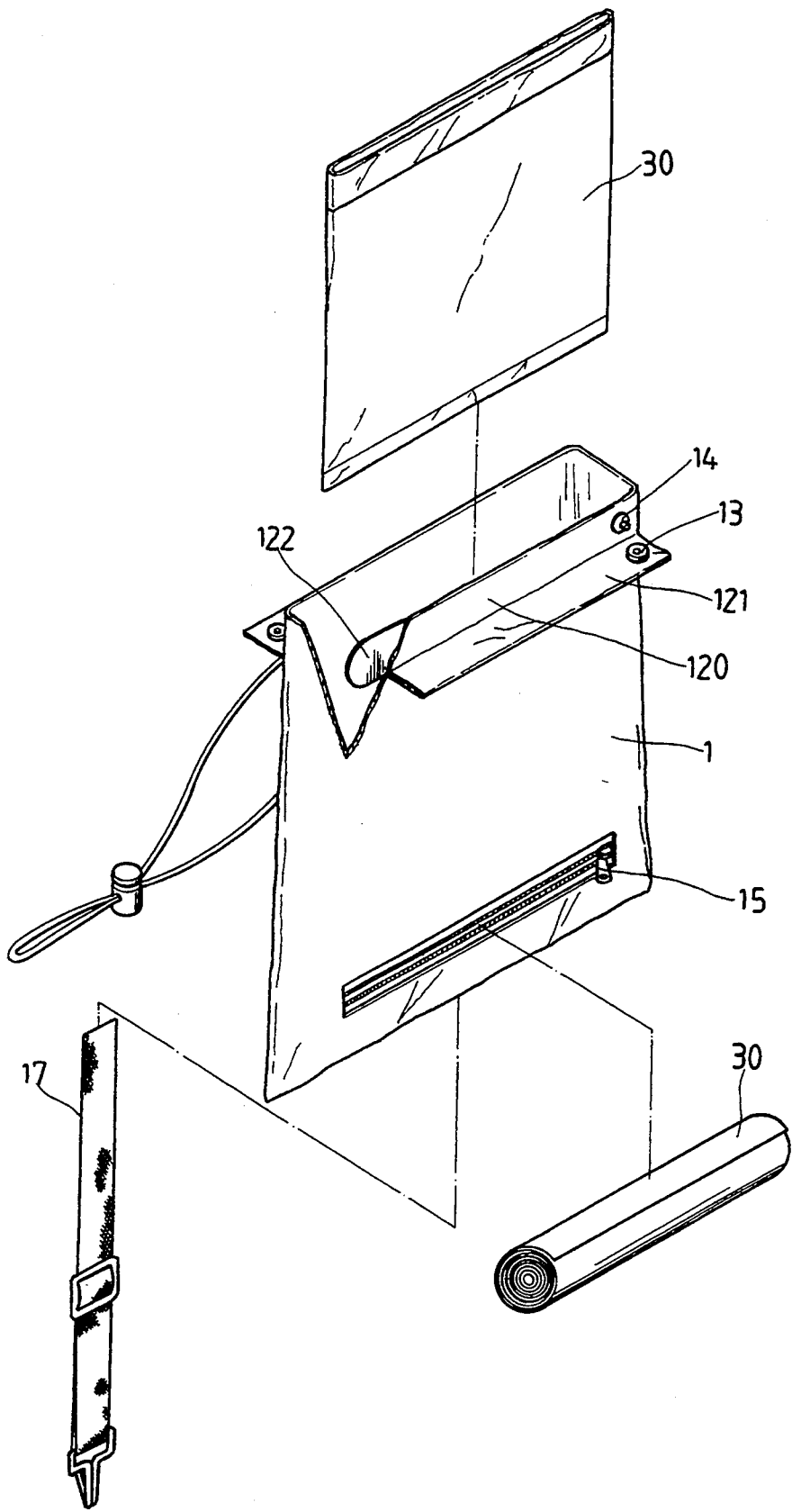
FIG. 1 is an exploded view of the present invention.
Figure 2:
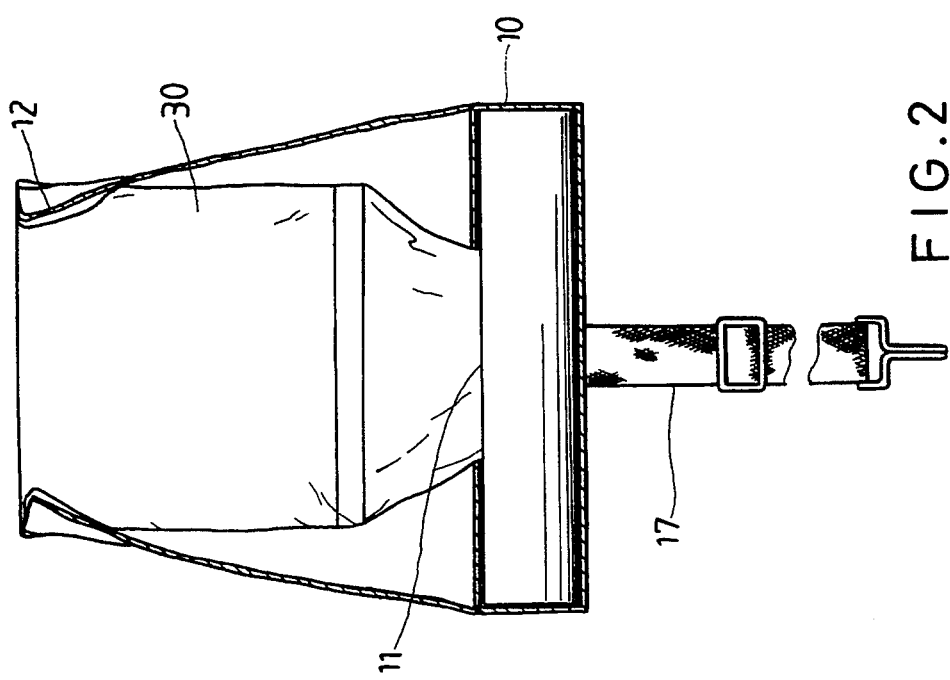
FIG. 2 is a sectional front view of the present invention.

With reference to the drawings and in particular to FIGS. 1 and 2 thereof, the litter bag for automobiles according to the present invention comprises a body portion 1 provided at the lower portion with a pocket 10 and on the outer surface with a zipper 15 through which a roll of plastic bags 30 may be disposed into the pocket 10. Further, the top of the pocket 10 has an elongated slit 11 through which the litter bag 30 may be conveniently drawn out for use. In addition, the bottom of the body portion 1 has a strap 17 which is designed to fix the body portion 1 under the seat.

Figure 3:
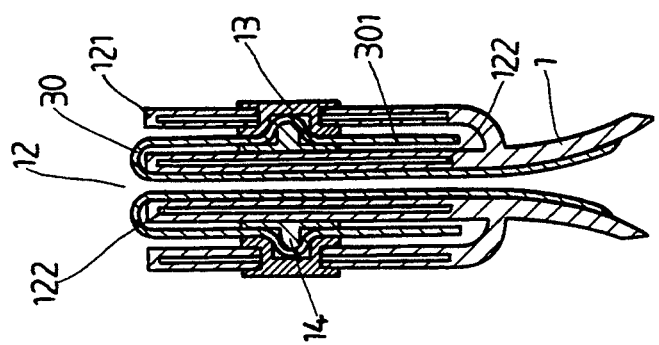
FIG. 3 is a sectional side view of the present invention.

Looking now at FIG. 3, each of the upper edges 120 of the body portion 1 is formed with a pocket in which is disposed a resilient member 122 in its interior for keeping the mouth of the body portion 1 closed normally and has a male connector 14 on both ends. Further, the body portion 1 is provided on both sides with a side flap 121 having on both ends a female connector 13 adapted to engage with the male connector 14 of the upper edge 120. In use, each upper edge 301 of the plastic bag 30 are clipped between an upper edge 120 of the body portion 1 and a side flap 121 and retained in position by the engagement between the male connector 14 and the female connector 13 so that the upper edges 301 of the plastic bag 30 will not be separated from the edges of the body portion 1 thereby preventing the trash (not shown) from getting out to make dirty the interior of the automobile. When desired to replace the plastic bag 30 with a new one, simply disengage the male connectors 14 from the female connectors 13, remove the plastic bag 30, and arrange a new plastic bag 30 in position.

Figure 4:
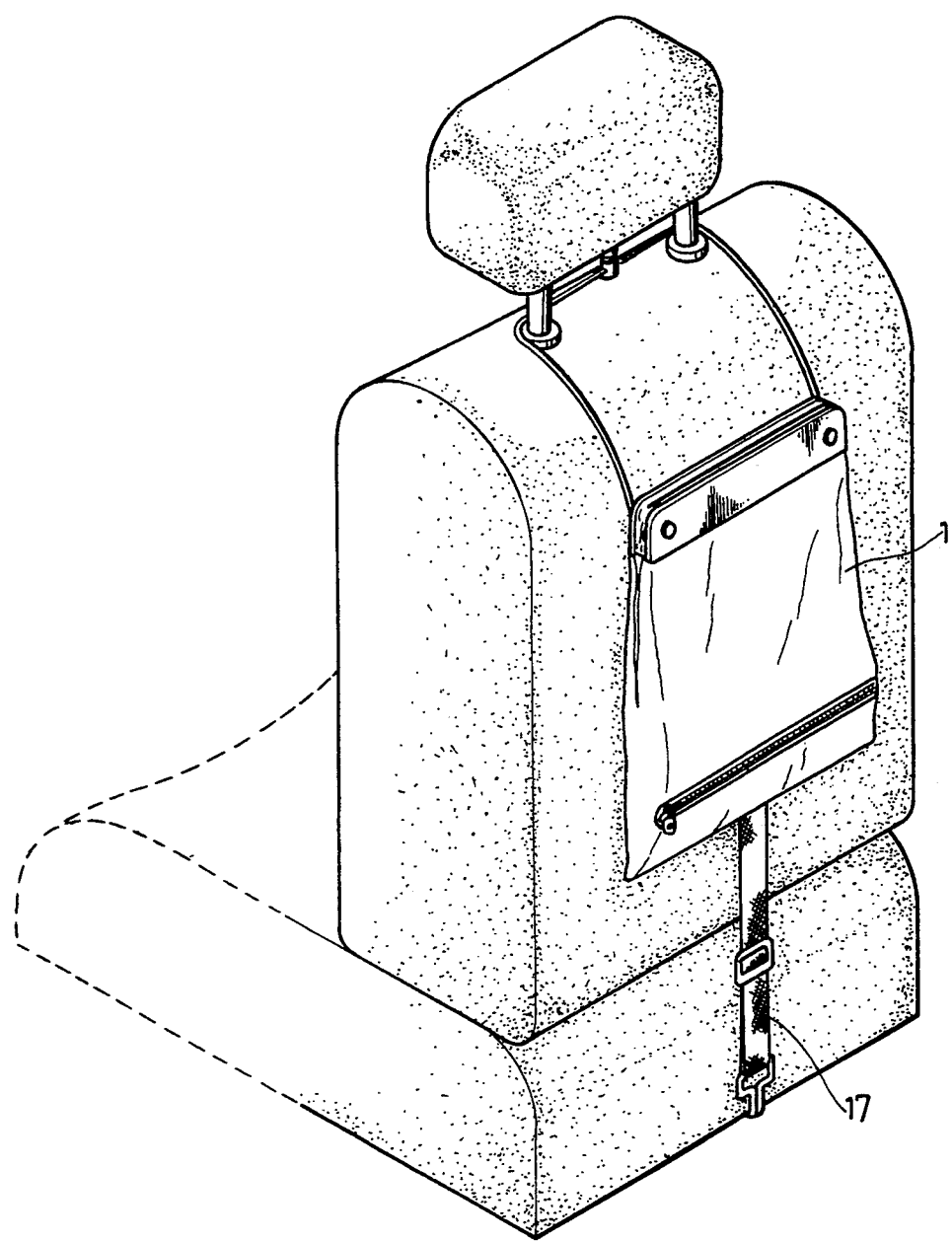
FIG. 4 is a working view of the present invention.

FIG. 4 shows a working view of the present invention. As illustrated, the body portion I may be provided with a string for hanging on the back of a seat and the body portion 1 may be made of opaque material.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A litter bag for automobile comprising:
   a body portion having front and rear sides, said body portion provided at a lower portion with a pocket and a zipper through which a roll of plastic bags can be disposed into said pocket, a top of said pocket having an elongated slit through which successive plastic bags can be drawn out for use;
   a bottom of said body portion having a strap for fixing said body portion under an automobile seat,
   each side of said body portion including an upper edge having a pocket in which is disposed a resilient member for biasing a mouth of each plastic bag in a closed condition, said upper edge further including male connectors on each end,
   said body portion being provided on each side with a side flap, said side flaps including female connectors opposing and engageable with said male connectors, wherein the male and female connectors maintain the mouth of each plastic bag about the upper edge of the sides of the body portion.

* * * * *